United States Patent [19]
Westrick et al.

[11] Patent Number: 5,559,498
[45] Date of Patent: Sep. 24, 1996

[54] COMBINATION CONFINEMENT AND REMOTE TRAINING SYSTEM

[75] Inventors: Michael D. Westrick; Greg V. Curen, both of Fort Wayne, Ind.

[73] Assignee: Innotek Inc., Fort Wayne, Ind.

[21] Appl. No.: 366,898

[22] Filed: Dec. 30, 1994

[51] Int. Cl.$^6$ .................................................. G08B 23/00
[52] U.S. Cl. ........................... 340/573; 119/721; 119/908
[58] Field of Search ............................ 340/573; 119/908, 119/721, 720; 455/347, 351, 352, 355, 68, 70, 88

[56] References Cited

U.S. PATENT DOCUMENTS

| | | | |
|---|---|---|---|
| 2,438,875 | 3/1948 | Offner | 607/45 |
| 2,800,104 | 7/1957 | Cameron et al. | 119/72 D |
| 2,843,129 | 7/1958 | Oyston et al. | 607/45 |
| 3,460,123 | 8/1969 | Bass | 340/573 |
| 3,478,344 | 11/1969 | Schwitzgebel et al. | 340/539 X |
| 3,508,235 | 4/1970 | Baisden | 340/573 X |
| 3,589,337 | 6/1971 | Doss | 119/72 D |
| 3,753,421 | 8/1973 | Peck | 119/721 |
| 3,834,379 | 9/1974 | Grant | 607/45 X |
| 3,850,161 | 11/1974 | Liss | 607/45 X |
| 3,885,576 | 5/1975 | Symmes | 340/573 X |
| 3,918,461 | 11/1975 | Cooper | 607/45 |
| 3,980,051 | 9/1976 | Fury | 119/720 X |
| 3,998,209 | 12/1976 | Macvaugh | 340/575 X |
| 4,048,986 | 9/1977 | Ott | 340/573 X |
| 4,163,449 | 8/1979 | Regal | 128/886 |
| 4,202,293 | 5/1980 | Gonda et al. | 119/718 |
| 4,203,098 | 5/1980 | Muncheryan | 340/575 |
| 4,210,150 | 7/1980 | James | 607/46 |
| 4,240,437 | 12/1980 | Church | 607/66 |
| 4,292,630 | 9/1981 | Dumont | 340/573 |
| 4,335,682 | 6/1982 | Gonda et al. | 119/719 |
| 4,359,724 | 11/1982 | Zimmerman et al. | 340/575 |
| 4,431,000 | 2/1984 | Butler et al. | 607/73 |
| 4,440,160 | 4/1984 | Fischell et al. | 128/846 |
| 4,441,210 | 4/1984 | Hochmair et al. | 455/41 |
| 4,524,773 | 6/1985 | Fischell et al. | 607/27 |
| 4,539,937 | 9/1985 | Workman | 119/721 |
| 4,627,385 | 12/1986 | Vinci | 119/908 X |
| 4,733,633 | 3/1988 | Yarnall, Sr. et al. | 119/721 |
| 4,745,882 | 5/1988 | Yarnall, Sr. et al. | 119/721 |
| 4,766,847 | 8/1988 | Venczel et al. | 119/721 |
| 4,802,482 | 2/1989 | Gonda et al. | 119/72 D |
| 4,887,549 | 12/1989 | Powell | 119/908 X |
| 4,898,120 | 2/1990 | Brose | 119/721 |
| 4,919,082 | 4/1990 | Tsai | 119/72 D |
| 4,967,695 | 11/1990 | Glunta | 119/721 |
| 4,967,696 | 11/1990 | Tobias | 119/719 |
| 4,996,945 | 3/1991 | Dix, Jr. | 119/721 |
| 5,046,453 | 9/1991 | Vinci | 119/718 |
| 5,054,428 | 10/1991 | Farkus | 119/72 D |
| 5,067,441 | 11/1991 | Weinstein | 119/721 |
| 5,121,711 | 6/1992 | Aine | 119/721 |

(List continued on next page.)

OTHER PUBLICATIONS

Comtrad Industries 1–page Brochure; Wirless Radio Fence, date unknown.

Walter S. Friauf; "An aversive stimulator for autistic children"; Medical and Biological Engineering; Sep. 1973; pp. 609–612.

Momentum Technology, Inc. Price List; Jun. 1984.

Momentum Technology Ad—Aug.–Sep. 1986; Retriever Field Trial News, p. 17.

Momentum Technology Ad—Hunting Retriever, Oct./Nov. 1986, p. 8.

Momentum Technology Ad, approx. Dec. 1984.

Invisible Fencing Brochure; 1992 Invisible Fence Co., Inc.

Primary Examiner—Thomas Mullen
Attorney, Agent, or Firm—Barnes & Thornburg

[57] ABSTRACT

A combination animal confinement and remote training system is disclosed. The system is selectable between a confinement mode that encourages an animal to remain within a predefined boundary area, a remote training mode that encourages the animal to engage in desirable activity or cease undesirable activity, and a combined remote training and confinement mode.

31 Claims, 9 Drawing Sheets

U.S. PATENT DOCUMENTS

| | | | |
|---|---|---|---|
| 5,161,485 | 11/1992 | McDade | 340/573 X |
| 5,170,149 | 12/1992 | Yarnall, Sr. et al. | 340/573 |
| 5,207,178 | 5/1993 | McDade et al. | 119/908 X |
| 5,207,179 | 5/1993 | Arthur et al. | 119/721 |
| 5,241,923 | 9/1993 | Janning | 119/721 |
| 5,307,759 | 5/1994 | Rose | 119/721 |
| 5,307,763 | 5/1994 | Arthur et al. | 340/573 X |
| 5,337,041 | 8/1994 | Friedman | 340/573 |
| 5,349,926 | 9/1994 | McCarney et al. | 119/721 |
| 5,353,744 | 10/1994 | Custer | 119/908 X |
| 5,381,129 | 1/1995 | Boardman | 340/573 |
| 5,435,271 | 7/1995 | Touchton et al. | 119/721 |
| 5,460,124 | 10/1995 | Grimsley et al. | 119/721 |

COMBINATION CONFINEMENT AND REMOTE TRAINING SYSTEM

BACKGROUND AND SUMMARY OF THE INVENTION

The present invention relates to a combination confinement and remote training system that is selectable between a confinement mode than encourages an animal to remain within a predefined boundary area, a remote training mode that encourages an animal to engage in desirable activity or cease undesirable activity, and a combined remote training and confinement mode.

Animal confinement systems are known. These systems typically include a wire that is buried beneath the ground or positioned above the ground to define an area in which it is desired to confine one or more animals. The confinement wire is connected to a transmitter that operates at a predetermined frequency. A receiver, tuned to the transmitter frequency, is fitted to each animal to be kept within the confinement area. Typically, each receiver is attached to a collar that is worn by an animal. A stimulator unit, also fitted to the animal, is electrically associated with the receiver and administers a stimulus to the animal as it nears the confinement wire (i.e., the edge of a confinement boundary). The stimulus can be in the form of an audio signal, an electrical shock, or both. The audio stimulus is typically either a beep or a prerecorded message. The electrical shock is typically administered via a pair of probes that are in contact with skin of the animal so that an electrical potential difference across the probes delivers a shock to the animal. In some systems, the level of electrical stimulus delivered to the animal increases if the animal continues to approach the wire. However, the intensity of the electrical stimulus is kept within tolerable limits in order to reduce the likelihood of physical or psychological injury to the animal.

Remote training systems designed to encourage an animal to engage in desirable activity, such as retrieving an object, or cease undesirable activity, such as digging or chewing, are known. These devices typically include a hand-held remote transmitter that transmits a signal of a predetermined frequency to a receiver that is fitted to the animal. This receiver is tuned to the frequency of the hand-held transmitter and also is typically fitted to the animal by a collar. A stimulator unit, similar to that used in confinement systems, is associated with the remote trainer receiver so that it administers an audio, electrical, or combined stimulus to the animal as described above.

Some remote training systems are capable of delivering electrical stimuli of differing levels of intensity to an animal. In some of these systems, the level of electrical stimulation is adjusted by changing a resistor mounted to the collar worn by the animal. In other systems, different levels of electrical stimulation are administered by depressing different buttons on the hand-held remote transmitter. Use of varying levels of stimulation is helpful in adapting a remote training system to animals of differing temperaments as well as to animals of differing sizes.

It is often desirable to be able to both confine one or more animals within a predefined area as well as train those animals. Currently, this requires the purchase and use of two different systems, a separate confinement system and a separate remote training system. It is possible for these two systems to interfere with one another depending upon the particular frequencies at which they are operating. In addition, use of two separate systems is expensive because of the presence of such things as two separate collars and stimulator units. Furthermore, use of two separate systems is time-consuming because one receiver and stimulator unit in a collar must be removed and replaced with another in order to change between modes.

In some animal confinement systems, varying levels (i.e., intensities) of electrical stimulation can be delivered to the animal. This is also true for some remote animal training systems. Use of varying levels of stimulation is helpful in adapting a system to animals of differing temperaments as well as animals of differing sizes. There are several techniques for delivering such varying levels. In some of these systems, the level of electrical stimulation is adjusted by changing a resistor mounted to the collar worn by the animal. This technique is time consuming, requires retrieval of an animal in order to change levels, and makes training difficult. In other systems, different levels of electrical stimulation are administered by depressing different buttons on the hand-held remote transmitter. One technique increases the amplitude of the signal delivered to the animal for various levels while keeping the rate (i.e., the duration) of the signal constant. At least one problem associated with this technique is that animals often do not receive lower levels of electrical stimulation due to insufficient open-circuit output voltage between probes of a stimulator unit. This is particularly true if the collar unit is loose fitting, overly large, improperly oriented on the animal, or if the probes get dirty.

Another technique for delivering electrical signal stimuli involves the application of constant amplitude pulses at varying rates (i.e., changing the number of pulses delivered in a fixed period of time) to provide different levels of stimulation. A problem with this stimulation technique is that the dynamic range of the correction stimuli perceived by the animal is very narrow. For example, too high of a perceived electrical stimulus delivered by such a system can cause destructive results in a "fine tuned" animal.

A combined animal confinement and remote training system that solved the above problems associated with current separate systems would be a welcome improvement. Accordingly, an embodiment of the present invention provides a combined animal confinement and remote training system. This system may be selectable between a confinement only mode, a remote training only mode, and a combined remote training and confinement mode. In the combined mode, remote training, if activated, takes priority over confinement. In an alternative embodiment of the present invention, the system is non-selectively configured and always in the remote training and confinement mode.

One embodiment of the present invention includes a confinement wire that is buried in the ground to define a confinement area in which an animal is to be kept. The confinement wire is attached to a transmitter that transmits a modulated signal at a predetermined frequency. In an embodiment of the present invention, the transmitter is operating at a frequency of approximately 10.7 KHz. A receiver is fitted to the animal by a collar that receives signals from the confinement transmitter. A stimulator unit is also fitted to the animal by the collar. As the animal approaches the confinement wire, it receives either an audio stimulation, an electrical stimulation or a combination of both to encourage it to remain within the containment boundary. In addition, in one embodiment, the level of electrical stimulation delivered to the animal increases if the distance between the animal and confinement wire continues to decrease. In all embodiments, each level of electrical stimulation is designed to be kept within tolerable limits in order to prevent physical or psychological injury to the animal.

An embodiment of the remote trainer of the present invention also includes a remote control unit having a transmitter that transmits a modulated signal of predefined frequency via an antenna. This signal contains coded information about the stimulus to be applied as well as the stimulator unit to be activated. The collar worn by the animal also includes a remote control unit receiver tuned to the frequency of the remote control unit transmitter. In a preferred embodiment, the remote control transmitter operates at a frequency of approximately 303 MHz.

An embodiment of the remote control trainer of the present invention allows one of eight different levels of stimulation to be delivered to the animal in the form of a tone only or a tone followed by one of seven increasing levels of electrical stimulation. This allows the remote trainer of the present invention to be used on a wide variety of animals of varying temperaments and sizes.

In one embodiment of the present invention, the receiver and stimulator unit of the present invention is controlled by a processor that is programmed to decode the modulated signals transmitted by the confinement wire and remote control unit. Based upon information obtained from a decoded signal, the processor directs the stimulator unit to administer the appropriate correction stimulus to the animal. This program can be modified to change the characteristics of the stimulus delivered to the animal (e.g., intensity of the stimulus) without expensive and time-consuming disassembly of the unit, thereby making the present invention more easily modifiable and adaptable to a wider degree of applications than current hard-wired systems. In addition, as discussed above, the present invention eliminates expense and saves time through the provision of a single, integrated unit that is easily changed between modes.

An embodiment of stimulation of the present invention varies both the amplitude and rate (i.e., duration) at which corrective electrical signal stimuli are delivered to the animal at various levels. At each level, the open circuit output voltage between probes of the stimulator is of sufficient amplitude to ensure that a corrective electrical signal stimulus is delivered to the animal if the collar is properly fitted. In this embodiment, a processor is programmed to activate the electrical stimulator to produce an output voltage of appropriate amplitude and rate for the selected level of stimulation. By varying both the amplitude and rate of each level of stimulation, the present invention increases the dynamic range of stimulation perceived by the animal over conventional training systems. This allows for better animal control and training. The various amplitudes and rates of the signal are easily modified to the particular needs of a user of the system. For example, smaller animals generally require lower levels of electrical signal stimuli than larger animals. This can be achieved by, for example, lowering the amplitude of the signals administered to such smaller animals, decreasing the rate at which the signals are delivered, or a combination of both.

Other objects, advantages and novel features of the present invention will become apparent from the following detailed description of the invention when considered in conjunction with the accompanying drawings.

DETAILED DESCRIPTION OF THE DRAWINGS

Figure 1:
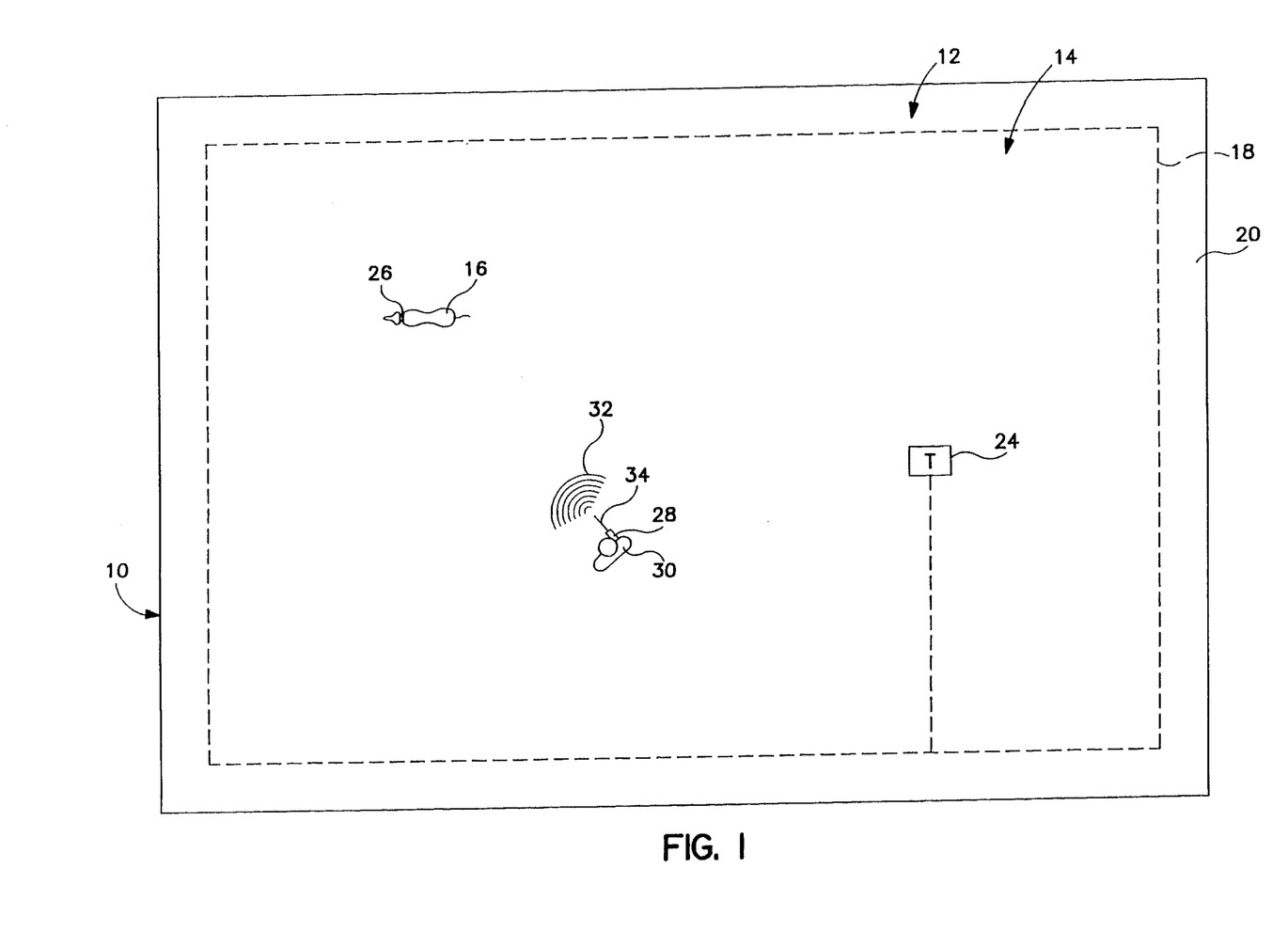
FIG. 1 is a top view of a selectable animal confinement and remote training system constructed in accordance with the present invention installed within a defined area and being used by a trainer with an animal.

A combined pet confinement and remote training system 10 of the present invention is shown installed and in use within an area 12. System 10 is used to both confine animal 16 within boundary 14 and to train animal 16.

An embodiment of system 10 has a confinement transmitter that includes a confinement wire 18 that may be buried beneath or positioned above ground 20 to define containment boundary 14 in which animal 16 is free to roam. Confinement wire 18 is electrically connected to a transmitter 24 that causes confinement wire 18 to emit an electromagnetic signal of a predetermined frequency. Animal 16 is fitted with a collar 26 to which a receiver (not shown in FIG. 1) is coupled. This receiver is tuned to the frequency of transmitter 24 so that it receives the electromagnetic signal transmitted by transmitter 24 and confinement wire 18 when animal 16 roams within a predefined distance of confinement wire 18. As animal 16 nears confinement wire 18, a processor causes a stimulator unit, both of which are attached to the collar but not shown in FIG. 1, to administer a warning tone only, an electrical shock, or a warning tone and electrical shock to animal 16. This stimulus encourages animal 16 to stay within containment area 14. In one embodiment, the intensity of the electrical stimulation administered to animal 16 is adjustable through a range of levels (i.e., intensities) and is preset by a user of system 10. This embodiment may also automatically increase the level of electrical stimulation delivered to the animal if it ignores an initial corrective stimulus and continues to decrease the distance between it and confinement wire 18.

Although not shown, an alternative embodiment of the present invention includes a transmitter operating at a predetermined frequency in lieu of confinement wire 18 and transmitter 24. The transmitter in this alternative embodiment defines a containment boundary (e.g., a circle of predefined radius) in which animal 16 is free to roam and administers a stimulus to the animal when outside of the boundary.

System 10 may be designed to cease electrical stimulation to animal 16 (i.e., time out) at a fixed time interval after the initiation of electrical stimulation to animal 16. This feature prevents over-stimulation of animal 16 in the event that it is unable or refuses to move away from confinement wire 18.

System 10 of the present invention may also include a remote control unit 28 that a trainer 30 can use to teach animal 16 to perform or not engage in certain activities. For example, a problematic animal 16 that engages in destructive digging can be encouraged to cease such activity through the use of system 10. Remote control unit 28 includes a transmitter (not shown) that transmits an electromagnetic signal 32 of a predetermined frequency via an antenna 34. Collar 26 worn by animal 16 also includes a separate receiver (not shown in FIG. 1) that is tuned to receive the electromagnetic signal transmitted by remote control unit 28.

An embodiment of system 10 of the present invention allows trainer 30 to administer a tone, an electrical stimulus, or a tone and electrical stimulus to animal 16 via remote control unit 28. As discussed more fully below, the levels of electrical stimuli delivered by remote control unit 28 may vary through a plurality of levels of increasing intensity that are selectable by trainer 30. Thus, an animal unreceptive to tone or low intensity stimulation can still be encouraged to engage in a particular activity or cease undesirable activity by trainer's 30 application of a higher level of a stimulation. In an embodiment of system 10, processor 10 is programmed so that remote training includes a time-out feature that prevents over-stimulation of animal 16 by ceasing the application of electrical stimulation to animal 16 a fixed time after such stimulation has been initiated.

In an embodiment of the present invention, system 10 is selectively configurable between confinement only, remote training only, or remote training and confinement modes. This allows system 10 to be adapted to the particular needs of a user at various times. For example, a user of system 10 may initially utilize only the confinement mode to keep animal 16 within the boundary of his or her home. However, animal 10, while confined within containment area 22, may begin such undesirable activity as digging. At that point, the home owner can switch to either the remote training mode or the confinement and remote training mode of system 10 in an effort to encourage animal 16 to cease such activity. Once animal 16 ceases such activity, the home owner may decide to switch system 10 back to the confinement only mode. As another example, a user of system 10 initially utilizing the confinement only mode to keep animal 16 within the boundary may switch to remote only mode to take animal 16 for a walk. After returning home, confinement only mode could then be selected. This selectability makes system 10 easy to use and effective at reducing costs because two separate systems (i.e., confinement and remote training) do not have to be purchased. In addition, system 10 saves time because the collar worn by animal 16 does not have to be changed when switching between modes. The modes of system 10 may be prioritized such that when the remote training and confinement mode is selected, the remote training takes priority over the confinement if a user 30 transmits electromagnetic signal 32 via remote control unit 28. This makes remote training within a defined containment area 22 possible. In another embodiment of the present invention, system 10 is non-selectively configured in the remote training and confinement mode.

Figure 2:
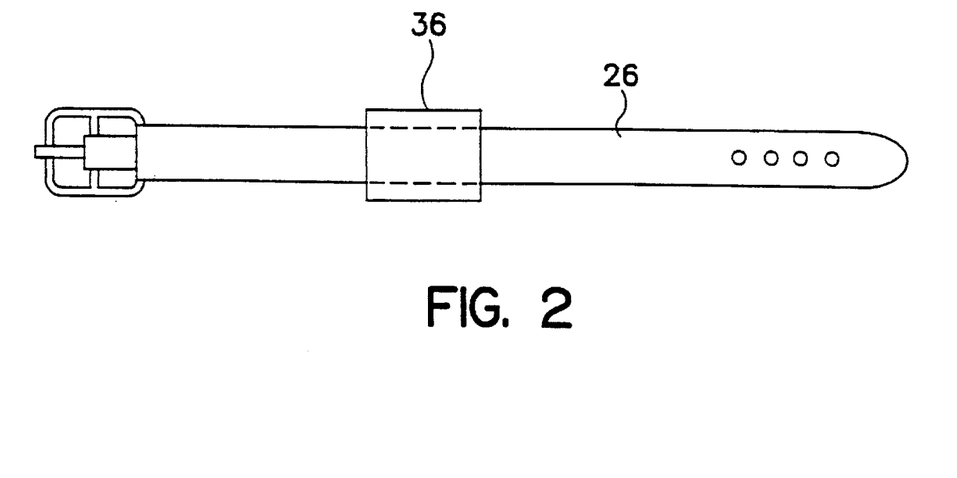
FIG. 2 is a view of a receiver and stimulator unit mounted on a collar that is used to attach the unit to an animal.

Collar 26 to which the confinement and remote training receivers, the processor, and the stimulation unit of system 10 are attached is shown in FIG. 2. The receivers, processor, and stimulation unit are contained within a housing 36 that is coupled to collar 26 as shown in FIG. 2. The receiver and stimulator unit housing 36 of system 10 is relatively small and compact compared within similar animal stimulation systems. This allows system 10 of the present invention to be used with a larger variety of animals such as small dogs and even cats. Although a particular arrangement for housing 36 are shown in FIG. 2, it is to be understood that the present invention is not limited by the type of collar and mounting arrangement chosen.

Figure 3:
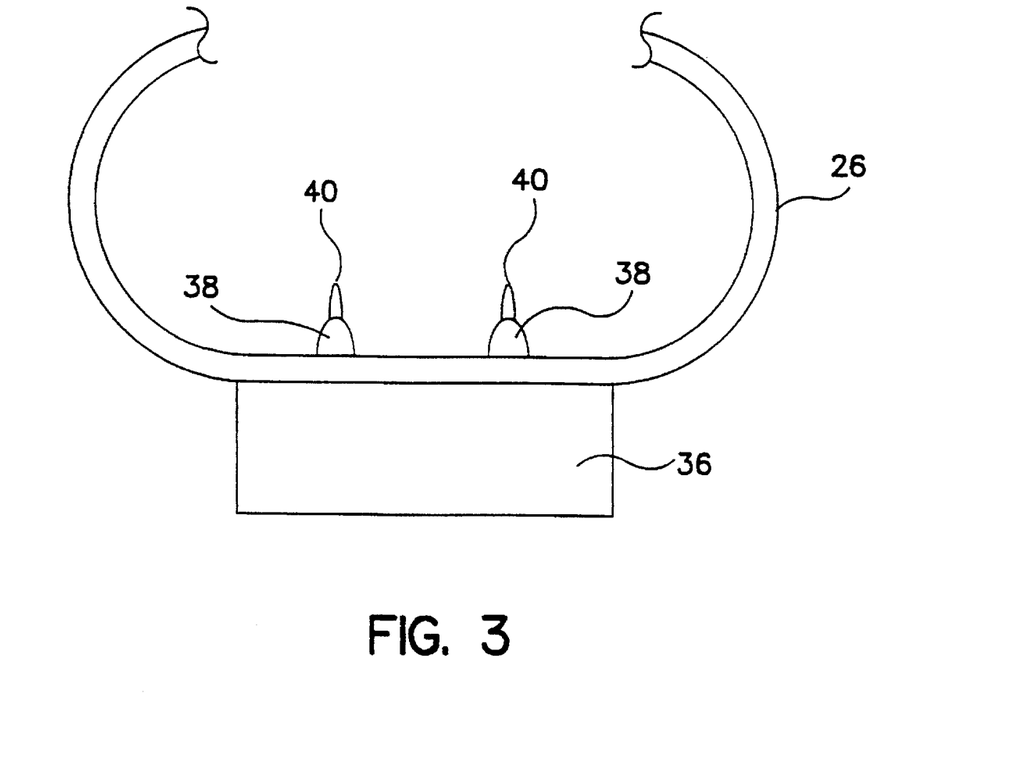
FIG. 3 is a side view of the receiver and stimulator unit shown in FIG. 2 illustrating a pair of probes, ends of which are designed to maintain contact with skin of an animal so that an electrical potential difference across the probes will be delivered to the animal.

A side view of collar 26 and housing 36 is shown in FIG. 3. A pair of probes or electrodes 38 of system 10 are shown projecting from housing 36. Probes 38 are each formed to include a generally rounded end 40 that is designed to maintain contact with skin of animal 16 when collar 26 is secured around its neck. Maintenance of such contact by ends 40 is highly desirable to ensure that animal 16 receives electrical stimulation from system 10. Such stimulation appears across probes 38 in the form of an electrical potential difference or open circuit voltage of a predetermined level. Some other probe designs without such ends have difficulty maintaining conductivity with the skin of the animal, particularly at lower open circuit voltages.

Figure 4:
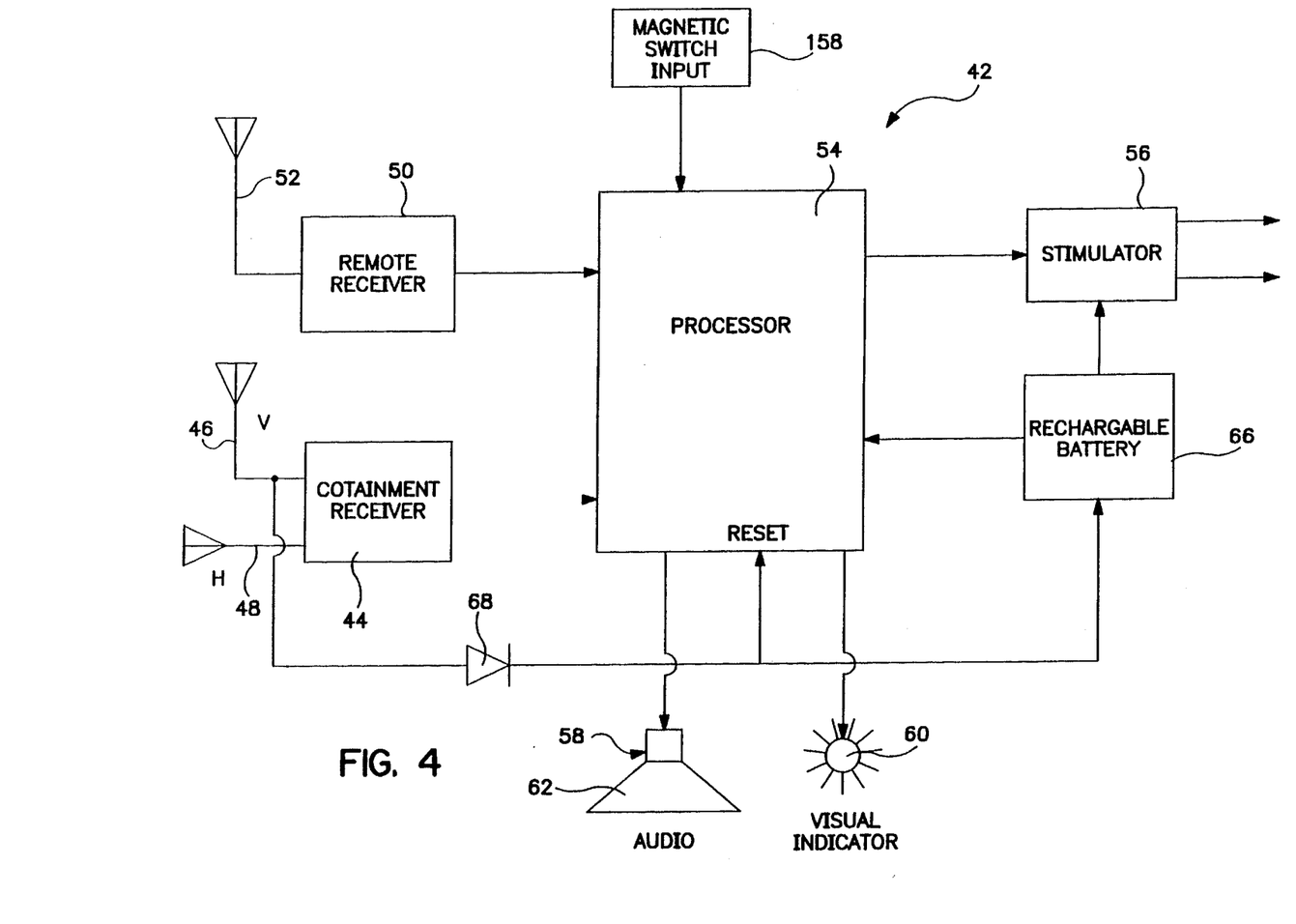
FIG. 4 is a block diagram of a receiver and stimulator unit constructed in accordance with the present invention.

A block diagram of an embodiment of a receiver and stimulator unit 42 of the present invention that is contained within housing 36 is shown in FIG. 4. This embodiment of unit 2 includes a dual channel containment receiver 44 that is tuned at a particular frequency to receive electromagnetic signals through vertical antenna 46 and horizontal antenna 48 that are transmitted by confinement wire 18 and transmitter 24. In one embodiment, dual channel containment receiver 44 is tuned to a frequency of approximately 10.7 KHz. The electromagnetic signals transmitted by confinement wire 18 and transmitter 24 are vertically polarized. Vertical and horizontal antennas 46 and 48 thus provide a greater range of movement by an animal while still maintaining a reliable link. Thus, use of a dual channel containment receiver 44 allows nearly omni-directional orientation of the collar receiver without signal nulls or dropout. Although a dual channel receiver 44 is disclosed, it is to be understood that other embodiments of the present invention may use a single channel receiver.

Figure 5:
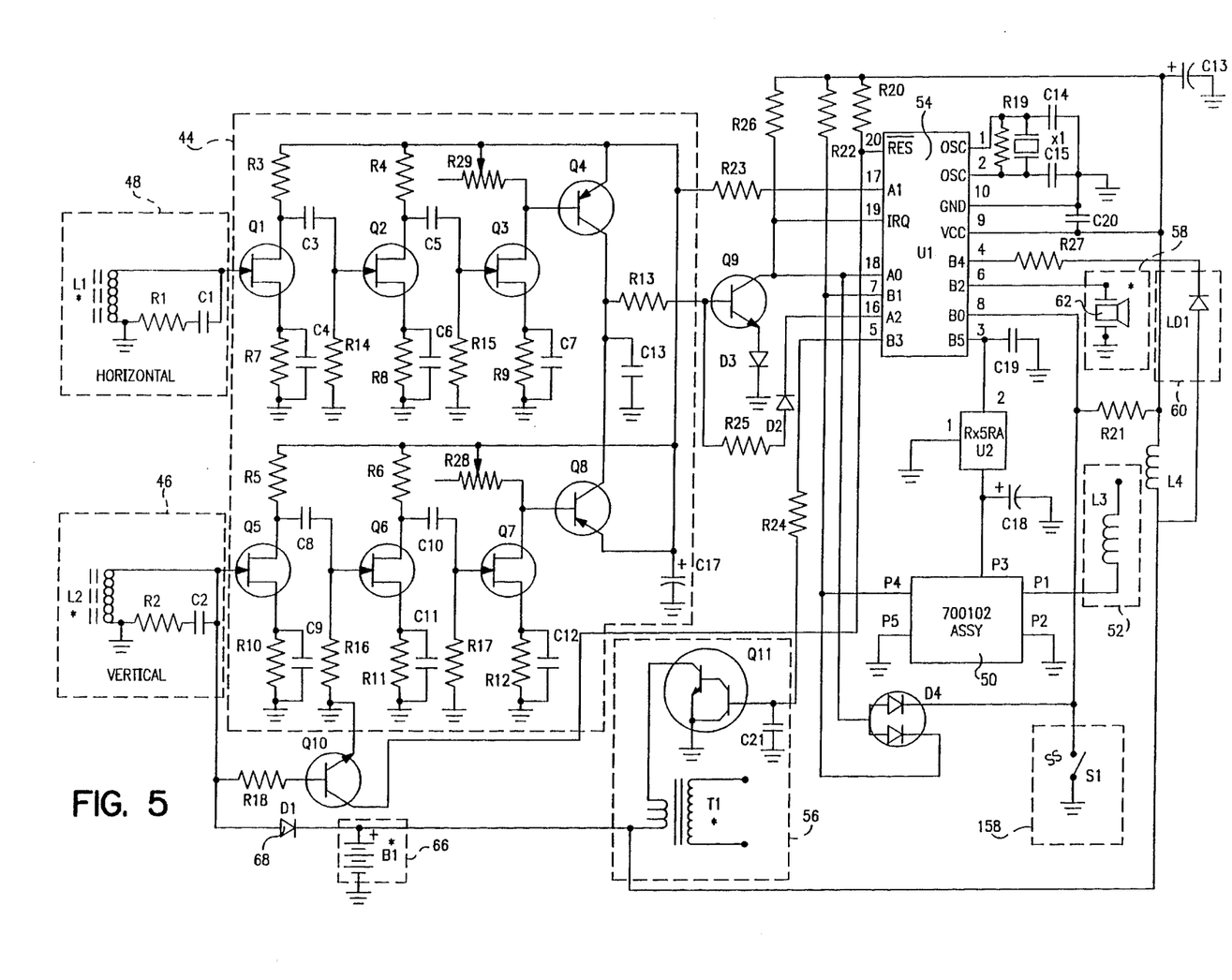
FIG. 5 shows a circuit schematic of an embodiment of a receiver and stimulator unit of the present invention.

Unit 42 also includes a remote receiver 50 that is tuned to a predetermined frequency to receive electromagnetic signals from remote control unit 28 through antenna 52. In a preferred embodiment, remote receiver 50 is tuned to a frequency of approximately 303 MHz. One design for receivers 44 and 50 is shown in FIG. 5. However, both dual channel receiver 44 and remote receiver 50 can be constructed from conventionally known designs as well.

Receiver and stimulator unit 42 also includes a processor 54 that accepts signals from receivers 44 and 50 and uses information contained in these signals, as more fully discussed below, to control electrical stimulator 56, audio stimulator 58, and visual indicator 60. Processor 54 can include any suitable microprocessor or controller that is programmable to receive information from receivers 44 and 50 and utilize this information to drive stimulators 56 and 58 as well as visual indicator 60 as described below. In one embodiment, processor 54 is sold by Motorola under the product identification number of MC68Hc705J2DW.

As shown in FIG. 5, electrical stimulator 56 includes a Darlington transistor Q11 that drives a high voltage step up transformer T1. Probes 38 are connected to the output side of high voltage step up transformer T1. Darlington transistor Q11 is driven through its base which is connected to an output pin B3 of processor 54. Although a preferred embodiment of electrical stimulator 56 is shown as including a Darlington transistor and high voltage step up transformer, it is to be understood that other equivalent structures are suitable for use as an electrical stimulator and within the scope of the present invention.

As also shown in FIG. 5, audio stimulator 58 includes a speaker 62 that is driven by a signal from output pin B2 of processor 54. Visual indicator 60 includes one or more light emitting diodes electrically connected to pin B4 of processor 54 through resistor R27.

Receiver stimulator unit 42 of the present invention is powered by a rechargeable battery 66 as shown in FIGS. 4 and 5. As also shown in FIGS. 4 and 5, battery 66 is recharged by the signal received through vertical antenna 46 and diode 68. Specifically, a coil in a battery recharger (not shown) is aligned with the coil of vertical antenna 46 so that the two are magnetically coupled. This magnetic coupling, in turn, creates a potential difference sufficient to trigger diode D1 and thereby recharge battery 66. Recharging of battery 66 is thus connectorless. In one embodiment, the electromagnetic signal emitted by the coil in the recharger is designed to be substantially "tuned" to the resonant frequency of vertical antenna 46 for optimal coupling. Battery 66 can include any suitable rechargeable battery that will provide sufficient power to enable unit 42 to function. In one embodiment, rechargeable battery 66 is a 3.6 volt, 150 mA NICAD battery pack.

When battery 66 is being recharged, processor 54 is reset. This is illustrated in the block diagram of FIG. 4, as well as schematically in FIG. 5. Specifically, as shown in FIG. 5, when the coil of the recharger and vertical antenna 46 are magnetically coupled, a sufficient current appears at the base of transistor Q10 to enable the reset RES at pin 20 of processor 54. Reset of processor 54 loads it with initialization values which are discussed more fully below in connection with initialization block 70 of FIG. 6.

Figure 6:
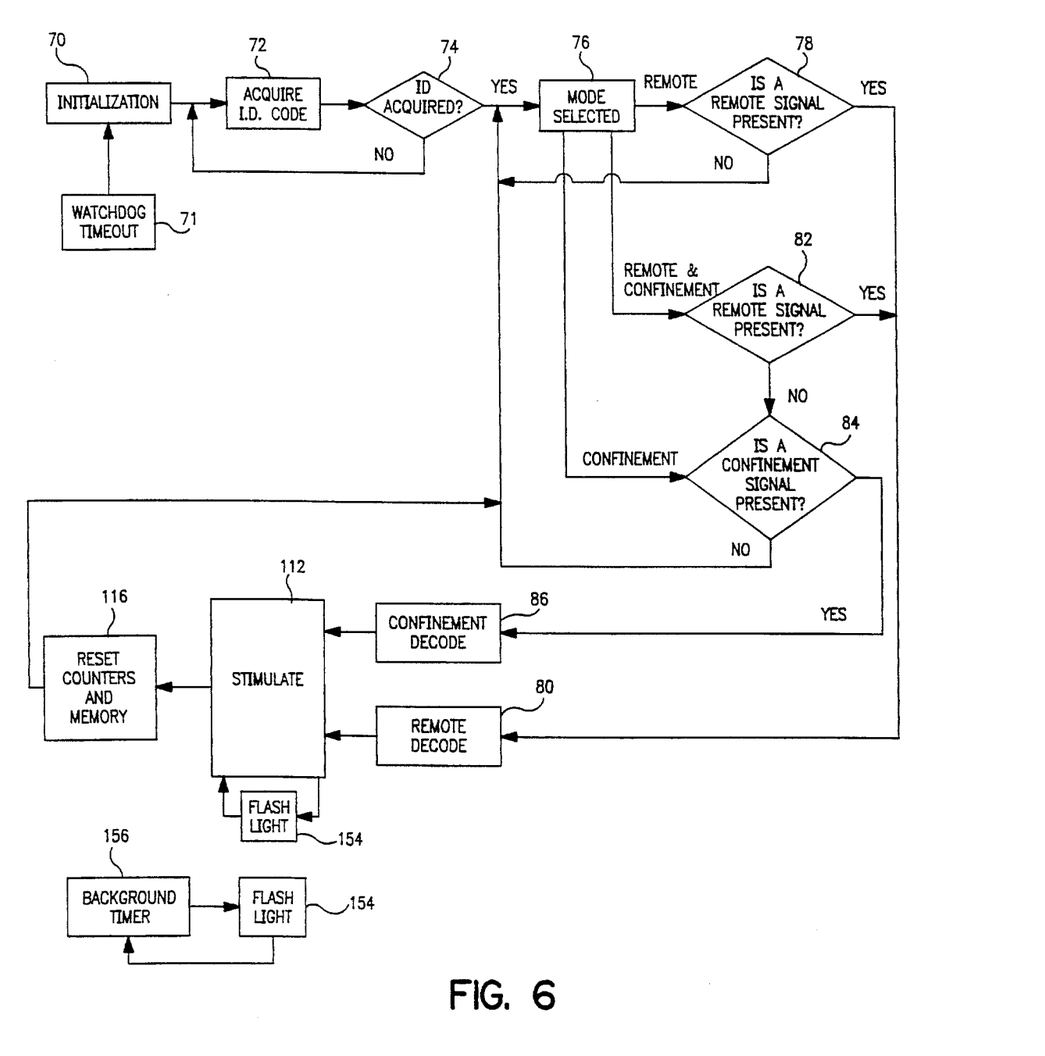
FIG. 6 shows a flow chart of the operation of a processor used in one embodiment of the receiver and stimulator unit of the present invention.

A flow chart illustrating the operation of processor 54 of receiver and stimulator unit 42 in one embodiment of the present invention is shown in FIG. 6. Upon power-up of unit 42, a program executing within processor 54 begins at initialization block 70 which loads the registers (not shown) of processor 54 with initialization (default) values for stimulation, receiver and stimulator unit identification, etc. After initialization, the program determines the I.D. code of a particular remote control unit 28 as indicated by acquire I.D. code block 72 and I.D. acquired block 74. In the illustrated embodiment of system 10 of the present invention, up to eight different receiver and stimulator units 42 are controlled via a single remote control unit 28. Remote control unit 28 of the present invention, as more fully discussed below in connection with FIG. 8, transmits information to unit 42 in modulated signal bytes having a duration of approximately 32 msec. The first three bits of each byte contain information with regard to the particular I.D. code for that receiver and stimulator unit 42. As is known, the use of three bits provides up to eight different combinations.

As shown in FIG. 6, the program includes a watchdog timeout routine or function block 71. Watchdog timeout block 71 reinitializes processor 54, as discussed above, if a predefined time interval elapses without response from processor 54 which indicates that it is probably "locked up." In one embodiment, this time interval is approximately five seconds.

Processor 54 can also be reset by placing a magnet (not shown) in sufficiently close proximity to housing 36 to cause magnetic switch 158, shown in FIG. 5, to close. Closing of magnetic switch 158 disables the signal response from processor 54 to the watchdog timer. If switch 158 is closed for a sufficient period of time (e.g., five seconds in the above-described preferred embodiment), watchdog timeout block 71 reinitializes processor 54 as discussed above. Resetting processor 54 in this way allows such things as the I.D. of unit 42 to be changed. In an embodiment of the present invention, the magnet is mounted within remote control unit 28.

After the I.D. code of unit 42 has been set, the program determines which mode is selected for system 10 as indicated by program block mode selected 76. If the remote mode has been selected, the program queries whether a remote signal is present as indicated by program block 78. If a remote signal is present, the program branches to remote decode block 80. If a remote signal is not present, the program branches back to mode selected block 76. If both the remote and confinement modes have been selected, the program determines whether a remote signal is present as indicated by program block 82. If a remote signal is present, the program branches to remote decode block 80. If a remote signal is not present, the program branches to program block 84 where it determines whether or not a confinement signal is present. A confinement signal will be present if animal 16 is within a predetermined distance of confinement wire 18 buried within ground 20 as discussed above. If a confinement signal is present, the program branches to confinement decode block 86. If a confinement signal is not present, the program branches back to mode selected block 76. If only the confinement mode has been selected, the program, at mode selected block 76, branches to block 84 where it determines, as discussed above, whether or not a confinement signal is present. In the illustrated embodiment shown in FIG. 5, the remote signal appears at port B1 of processor 54 and the confinement signal appears at port Aφ. In one embodiment of the present invention, the different modes are selected by actuating magnetic switch 158 which is associated with a latch in processor 54 so that each time switch 158 is closed, processor 54 advances to the next mode. In one embodiment, after battery 66 has been recharged, unit 42 is initially in remote only mode. If switch 158 is again actuated, unit 42 goes into confinement only mode. Another actuation of switch 158 again, advances unit 42 back to the remote only mode where it can be cycled through the various modes again as discussed above.

As discussed above, the illustrated embodiment of system 10 of the present invention transmits information to receiver and stimulator unit 42 of the present information in bytes having a length of approximately 32 msec. for signals from remote control unit 28 and approximately 64 msec. for signals from confinement transmitter 24. The confinement transmitter signal is approximately twice as long as the remote control unit signal because, in this embodiment, the carrier frequency of the confinement signal is approximately 10.7 KHz whereas the carrier frequency of the remote signal is approximately 303 MHz. Because of the relatively lower frequency of the confinement modulation signal, the duration of the confinement signal is increased to have a sufficient modulation ratio for receiver 44. During either time interval, processor 54 decodes the information contained in these bytes in order to determine such things as the I.D. code, the type of stimulation to be applied to the animal (i.e., audio and/or electrical), and the level of electrical stimulation, if any. The stimulation is applied to the animal during a second 32 msec. time interval for remote stimulation or a second 64 msec. time interval for confinement stimulation. During the second 32 msec. or 64 msec. time interval, processor 54 does not accept any transmitted signal bytes from unit 28.

Figure 7:
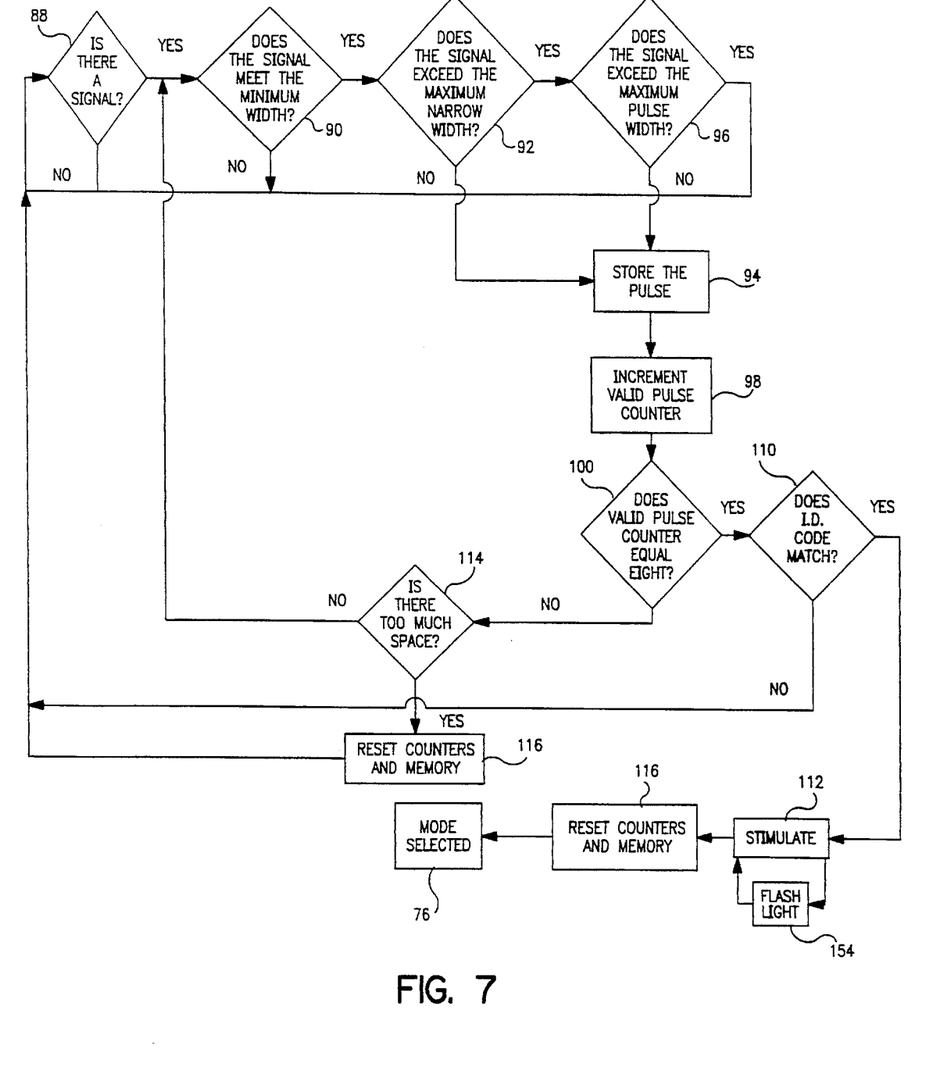
FIG. 7 shows a flow chart of the operation of both the confinement decode and remote decode blocks shown in FIG. 6.

FIG. 7 is a flow chart illustrating the operation of the processor program for both remote decode block 80 and confinement decode block 86 of FIG. 6. Once processor 54 determines whether either a confinement or remote signal is present as indicated by block 88, it determines whether or not the signal meets the minimum width required for a bit of information as indicated by program block 90. The minimum signal width requirement allows for discrimination of valid signals from transient spikes or noise. In the disclosed embodiment, the minimum width requirement for a remote signal is approximately 0.250 msec. and approximately 0.750 msec. for a confinement signal. If the signal exceeds the minimum pulse width, the program next branches to block 92 to determine whether or not the signal exceeds the maximum narrow width which determines whether or not the signal bit is a logic "0." In the illustrated embodiment, the maximum narrow width is approximately 1 msec. for a remote signal and approximately 2 msec. for a confinement signal. On the other hand, if the signal does not meet the minimum pulse width, the program branches back to block 88 where it again determines whether or not a remote or confinement signal is present, as discussed above.

If the signal does not exceed the maximum narrow width, it is considered a logic "0" and stored in a register of processor 54 as indicated by program block 94 in FIG. 7. If the signal exceeds the maximum narrow width, the program branches to block 96 to determine whether or not the signal exceeds the maximum pulse width. If the signal does not exceed the maximum pulse width, it is considered to be a logic "1" and is stored in a register of processor 54 as indicated by program block 94 in FIG. 7. If the signal exceeds the maximum pulse width, it is considered to be an invalid signal and the program branches back to block 88 to again determine whether or not a remote or confinement signal is present. The maximum width requirement helps to discriminate against false signals as does the minimum width requirement. In the illustrated embodiment, the maximum pulse width is approximately 3.5 msec. for remote signals and approximately 6.5 msec. for confinement signals.

Subsequent to storing a pulse, the program increments a counter in processor 54 as indicated by program block 98 in FIG. 7. The program next branches to block 100 to determine whether or not a valid pulse counter within processor 54 has a value of 8. If the pulse counter does have a value of 8, this indicates that a byte of information has been transmitted from either confinement wire 18 and transmitter 24 or remote control unit 28. The program branches to block 110 to determine whether or not the I.D. code of unit 42, set in program blocks 72 and 74, discussed above, matches the I.D. code of the received signal. If there is an I.D. code match, the program branches to stimulate block 112, discussed in more detail below in connection with FIG. 9. If there is no match, the program branches to block 88 to look for another signal. If the valid pulse counter does not equal 8, the program branches to block 114 to determine whether or not there is too much space between pulses received by unit 42. For a remote signal, each bit is spaced approximately 4 msec. apart. For a confinement signal, each bit is spaced approximately 8 msec. apart. Block 114 of the program looks at the pulse spacing for either this 4 msec. or 8 msec. value to determine if the signal has stopped.

Depending on the mode selected, if either the 4 msec. or 8 msec. spacing has elapsed, the received signal is considered invalid and the program branches to block 116 where the counters and memory of processor 54 are reset. The counters and memory contain the minimum width, maximum narrow width, maximum width, pulse spacing, number of pulses, and identification parameters used to determine whether a valid signal is present. If there is not too much space between pulses, the program branches back to block 90 to process the next transmitted pulse bit in a signal byte.

Figure 8:
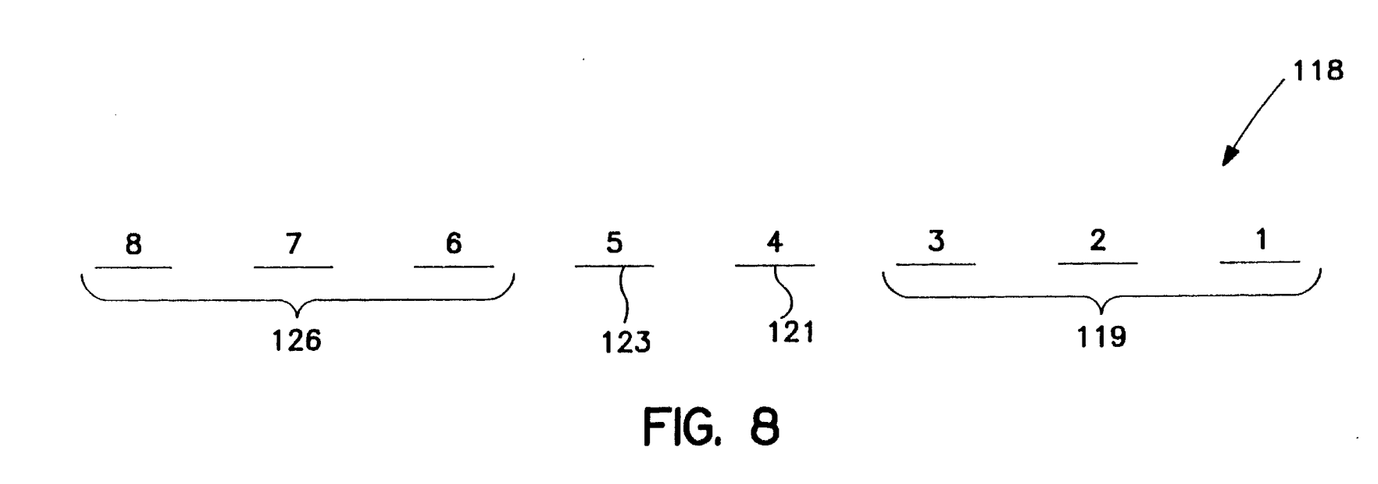
FIG. 8 is an illustration of a remote stimulation signal byte of the present invention.

FIG. 8 illustrates a remote stimulation signal byte 118 of information of the present invention transmitted by remote control unit 28 to receiver and stimulator unit 42. In the illustrated embodiment of remote stimulation signal byte 118, the first three bits 119 contain information about the I.D. code as discussed above. Use of three bits of information for the I.D. code of a transmitter allows information of up to eight different I.D. codes to be carried by a single stimulation signal byte 118. The fourth bit 121 provides information as to whether audio stimulation should be provided for approximately one second prior to electrical stimulation. The fifth bit 123 provides information to processor 54 as to whether or not audio stimulator 58 should be enabled. If the signal from remote control unit 28 is removed prior to the end of the approximately one second elapse of the audio stimulation, then no electrical stimulation is administered to the animal. The sixth, seventh, and eighth bits of stimulation signal byte 118 provide information to processor 54 as to the level of stimulation to be administered to animal 16. These three bits are designated as electrical stimulation level bits 126. Use of three bits of information allows receiver and stimulator unit 42 to administer up to eight different levels of stimulation to animal 16 as discussed more fully below.

Figure 9:
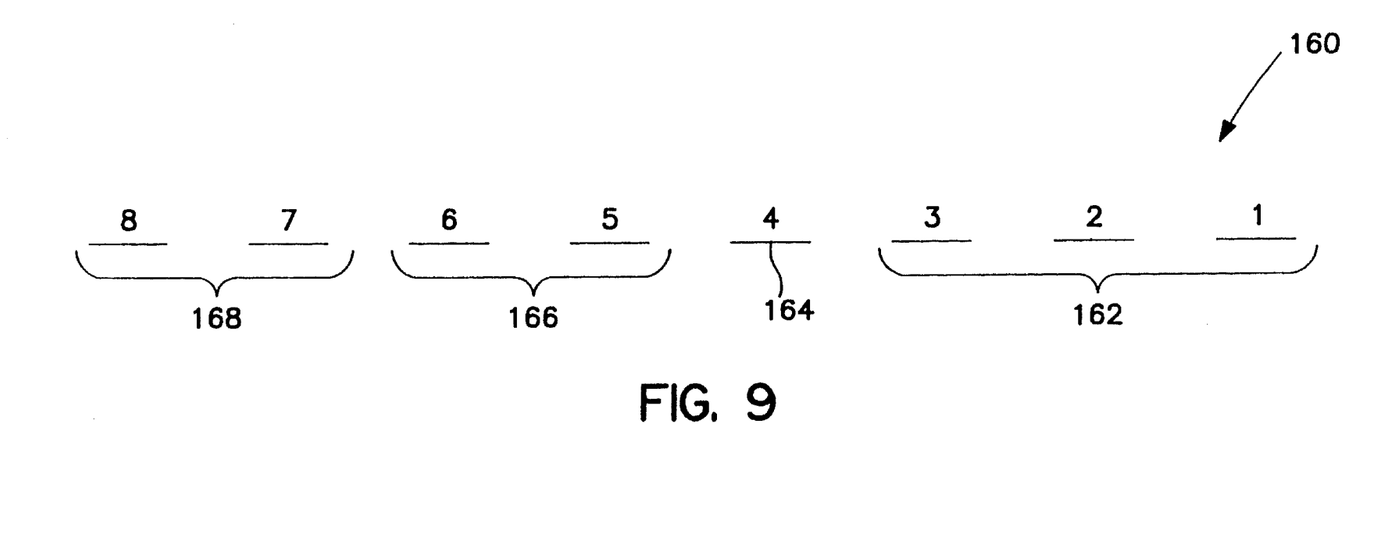
FIG. 9 is an illustration of a confinement stimulation signal byte of the present invention.

FIG. 9 illustrates a confinement stimulation signal byte 160 of information of the present invention transmitted by confinement wire 18 and transmitter 24 to receiver and stimulator unit 42. In the illustrated embodiment of confinement stimulation signal byte 160, the first three bits 162 contain information about the I.D. code as discussed above. In the case confinement stimulation signal byte 160, the I.D. code is the same for all units 42. The fourth bit 164 provides information as to whether audio stimulation should be provided for approximately one second prior to electrical stimulation. The fifth and sixth bits provide information to processor 54 as to the level of stimulation to be administered to animal 16. These two bits are designated as electrical stimulation level bits 166. Use of two bits of information allows receiver and stimulation unit 42 to administer up to four different levels of stimulation to animal 16 as discussed more fully below. The seventh and eighth bits 168 when set to logic "one" cause processor 54 to automatically increase the level of stimulation administered to animal 16 if the animal continues to approach confinement wire 18 after already having received a lower-level stimulation.

Figure 10:
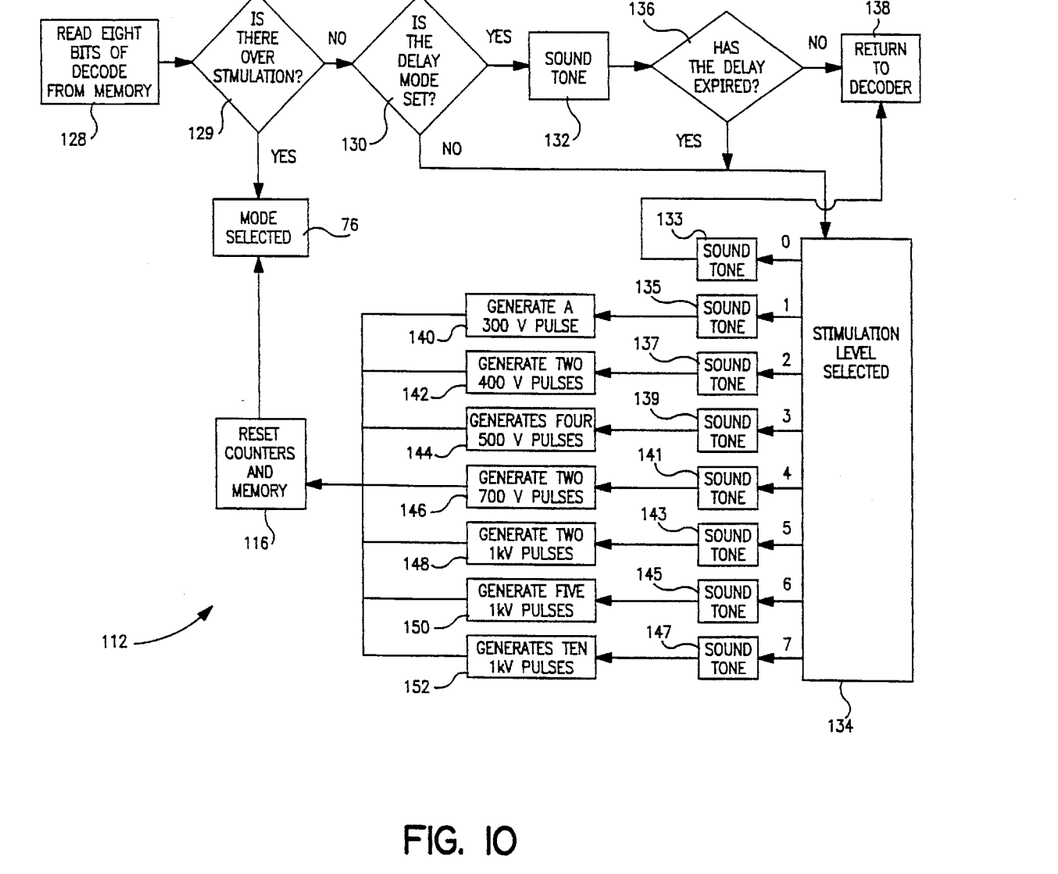
FIG. 10 shows a flow chart of the operation of the stimulate block shown in FIGS. 6 and 7.

FIG. 10 is a flow chart illustrating the operation of the program executing within processor 54 used to drive stimulator 56 when stimulate block 112 is performed. In the illustrated embodiment, processor 54 first reads the eight bits of the decoded remote or confinement stimulation signal byte stored in the memory of processor 54 as indicated at block 128 in FIG. 10. The program then branches to block 129 to determine whether the animal is being overstimulated. Unit 42 is designed to cease administration of continuous electrical stimulation upon the expiration of a predetermined time interval. This is designed to prevent an animal from receiving too much stimulation which may cause physical and emotional injury to the animal. In a preferred embodiment, unit 42 is configured to administer electrical stimulation for a maximum of 10 seconds.

The program next determines whether or not the delay mode has been set as indicated by block 130 in FIG. 10. Delay is indicated by bit 121 of byte 118 and bit 164 of byte 160. As discussed above, if this bit is a logic "one," an audio stimulation is administered for approximately 1 msec. prior to electrical stimulation. If the delay mode has been set, the program branches to sound tone block 132 which causes processor 54 to activate audio stimulator 58 for a predetermined period of time. If the delay mode is not set, the program branches to stimulation level selected block 134 which initiates a corrective stimulus of one of eight different levels to animal 16 for remote stimulation and one of four different levels to animal 16 for confinement stimulation.

After sounding a tone, the program branches to block 136 to determine whether or not the delay has expired. If the delay has expired, the program branches to stimulation level selected block 134. If the delay has not expired, the program branches to return to decoder block 138 where it determines whether a remote or confinement signal is still present as discussed above in connection with blocks 78, 82, and 84 of FIG. 6. If either a valid remote or confinement signal is still present, then the tone continues to sound if the delay has not expired or the program executes stimulation level selected block 134.

At stimulation level selected block 134, the program determines the level of stimulation to be administered to the animal from electrical stimulation level bits 126 of remote stimulation signal byte 118 or electrical stimulation level bits 166 of confinement stimulation signal byte 160. If level zero is selected, the program branches to sound tone block 133 which, as discussed above, causes processor 54 to enable audio stimulator 58. Subsequently, the program branches to return to decoder block 138. If stimulation level 1 is selected, the program branches to sound tone block 135 and subsequently branches to block 140 where a signal pulse with a duration of approximately 1 msec. and a potential difference of approximately 300 volts is applied across probes 38 to animal 16. If stimulation level 2 is selected, the program branches to sound tone block 137 and subsequently to block 142 where electrical stimulator 56 administers two pulses, each having a duration of approximately 1 msec. and a potential difference of approximately 400 volts, across probes 38 to animal 16. If stimulation level 3 is selected, the program branches to sound tone block 139 and subsequently to block 144 where electrical stimulator 56 administers four pulses, each having a duration of approximately 1 msec. and a potential difference of approximately 500 volts, across probes 38 to animal 16. If stimulation level 4 is selected, the program branches to sound tone block 141 and subsequently to block 146 where electrical stimulator 56 administers two pulses, each having a duration of approximately 1 msec. and a potential difference of approximately 700 volts, across probes 38 to animal 16. If stimulation level 5 is selected, the program branches to sound tone block 143 and subsequently to block 148 where electrical stimulator 56 administers two pulses, each having a duration of approximately 1 msec. and a potential difference of approximately 1 kV, across probes 38 to animal 16. If stimulation level 6 is selected, the program branches to sound tone block 145 and subsequently to block 150 where electrical stimulator 56 applies 5 pulses, each having a duration of approximately 1 msec. and a potential difference of approximately 1 kV, across probes 38 to animal 16. Finally, if stimulation level 7 is selected, the program branches to sound tone block 147 and subsequently to block 152 where electrical stimulator 56 applies 10 pulses, each having a duration of approximately 1 msec. and a potential difference of approximately 1 kV, across probes 38 to animal 16.

Although particular values are given for each level of stimulation, it is to be understood that the present invention is not limited to these values and that other values are within its scope. In addition, different types of stimulation may be administered at one or more of the levels. For example, two successive tones could be administered at levels 1 and 2 instead of a tone followed by electrical stimulation shown. Alternatively, instead of sounding a tone at level 0 and a tone prior to electrical stimulation for levels 1–7, only an electrical stimulation could be delivered for levels 0–7. Other variations are within the scope of the present invention and these examples are, in no way, intended to be limiting. As shown in FIG. 6, subsequent to stimulation, the program executing in processor 54 branches back to reset counters and memory block 116, the operation of which was discussed above, and subsequently to mode selected block 76.

Figure 11:
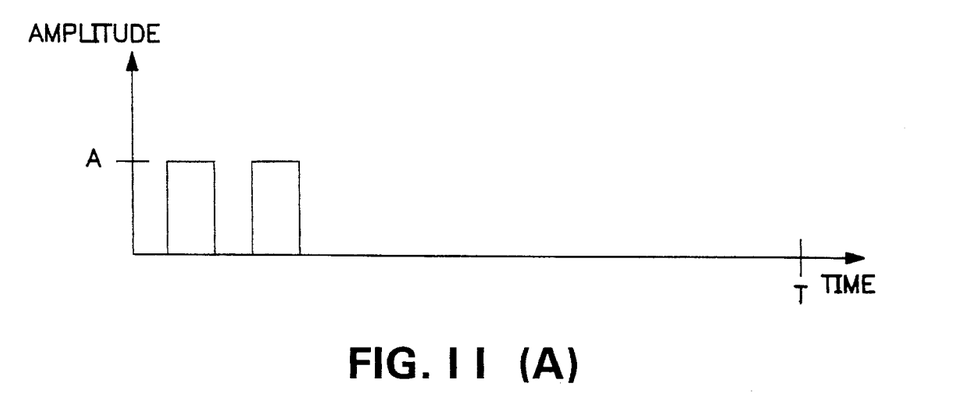
FIG. 11 is an illustration of an animal stimulation technique of the present invention that varies both the amplitude of the signal stimulus delivered to an animal as well as the rate of that signal for each level of stimulation.

An animal stimulation technique of the present invention is shown in FIG. 11. Three levels of electrical stimulation are shown in FIG. 11. As can be seen, both the amplitude (A, B, and C where A is less than B which is less than C) and the rate (where T is a fixed time interval) at which corrective electrical signal stimuli are delivered to the animal, vary. This increases the dynamic range of electrical signal stimuli perceived by the animal.

Although only three levels of stimulation are shown in FIG. 11, it is to be understood that additional levels of stimulation are possible, as illustrated in FIG. 10. Limiting factors for the number of levels include the minimum open circuit output voltage required for the probes of the stimulator unit to deliver a corrective electrical stimulus to an animal and the rate at which pulses can be delivered before the animal no longer is able to receive any difference between levels.

As shown in FIG. 7, during execution of stimulate block 112, the program executes flash light block 154 which illuminates light emitting diode LD1 of visual indicator 60 shown in FIG. 5. Background timer block 156, shown in FIG. 6, causes flash light block 154 to execute every predefined number of seconds for certain modes to indicate that system 10 is operating properly. In one embodiment of the present invention, flash light block 154 is configured so that light emitting diode LD1 of visual indicator 60 will not flash if the confinement only mode is selected, will slowly flash approximately every two seconds if the remote only mode is selected, and will quickly flash approximately every two seconds if the remote and confinement mode is selected.

Receiver and stimulator unit 42 of the present invention may be turned on and off by a magnetic switch input as indicated at 158 in FIGS. 4 and 5. As discussed above, in one embodiment, the magnet for magnetic switch 158 is mounted in remote control unit 28. Receiver and stimulator unit 42 is turned on and off by passing the magnet within remote control unit 28 close to switch 158.

Many of the above-described characteristics of the present invention are easily changed by reprogramming processor 54 of receiver and stimulator unit 42. For example, one or more of the various voltage levels and pulse rates administered by stimulate block 112 can be readily changed by reprogramming processor 54. This makes system 10 easily configurable to administer a particular set of levels of stimulation as required by the conditions under which it is to be used. Thus, system 10 does not require costly and time consuming reconfiguration as do hardware-based systems.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A combined animal confinement and remote training system, comprising:

a confinement wire oriented to define a boundary;

a confinement transmitter associated with the confinement wire so that the confinement wire emits a transmitter signal from the confinement transmitter;

a confinement receiver fitted to the animal and tuned to receive the transmitter signal from the confinement transmitter;

a remote transmitter actuable to transmit a remote correction signal;

a remote receiver fitted to the animal and tuned to receive the remote signal from the remote transmitter;

a stimulator fitted to the animal; and a processor associated with the stimulator and the confinement and remote receivers, the processor decoding both the remote correction signal and the transmitter signal from the confinement transmitter and activating the stimulator to administer a stimulation signal to the animal upon decoding one of the remote correction signal and the transmitter signal from the confinement transmitter.

2. The system of claim 1, wherein the processor is configured to decode the remote correction signal and activate the stimulator before decoding the signal from the confinement transmitter.

3. The system of claim 1, wherein the processor is selectively configurable to one of a plurality of modes, including a remote only mode in which the processor decodes only the remote correction signal, a confinement only mode in which the processor decodes only transmitter signals from the confinement transmitter, and a remote and confinement mode in which the processor decodes one of the remote correction signal and the transmitter signal from the confinement transmitter.

4. The system of claim 3, wherein the processor is configured to one of the three modes by activating a magnetic switch associated with the processor such that each time the switch is closed, the mode changes.

5. The system of claim 1, wherein the processor is a microprocessor.

6. The system of claim 1, wherein the stimulator is configured to administer both an audio stimulus and an electrical stimulus.

7. The system of claim 6, wherein the processor is configured to increase an intensity level of electrical stimulus delivered to the animal in response to a decoded transmitter signal from the confinement transmitter as the distance between the animal and confinement wire decreases.

8. The system of claim 1, wherein the remote transmitter is actuable to transmit first and second correction signals that are received by the remote receiver and decoded by the processor, and further wherein the processor is configured to activate the stimulator to administer a first stimulus to the animal in response to the first correction signal and a second stimulus in response to the second correction signal that is different from the first stimulus.

9. The system of claim 8, wherein the stimulator is configured to administer both an audio stimulus and an electrical stimulus, and further wherein the first stimulus is an audio stimulus and the second stimulus is an electrical stimulus.

10. The system of claim 8, wherein the stimulator is configured to administer electrical stimuli, and further wherein the first stimulus is a first electrical stimulus and the second stimulus is a second electrical stimulus of higher intensity than the first electrical stimulus.

11. The system of claim 1, wherein the processor is configured to administer the stimulation signal for only a predefined period of time to prevent overstimulation of the animal.

12. The system of claim 1, wherein the transmitter signal emitted by the confinement transmitter includes a carrier signal and a plurality of substantially identical stimulation signal bytes that are modulated by the carrier signal.

13. The system of claim 12, wherein the frequency of the carrier signal is approximately 10.7 KHz.

14. The system of claim 12, wherein a plurality of confinement receivers are each fitted to different animals and are tuned to receive the transmitter signal from the confinement transmitter; a plurality of stimulators are each fitted to one of the different animals and are each capable of administering a plurality of levels of stimulation; a plurality of processors are each fitted to one of the different animals, each being associated with the stimulator and confinement receiver on that animal, and each having a different identification number; and further wherein three bits of each stimulation signal byte contain information as to the identification of the processor, two bits of each stimulation signal byte of the transmitter signal emitted by the confinement transmitter contain information as to the level of stimulation to be administered to the animal, and one bit of each stimulation signal byte of the transmitter signal emitted by the confinement transmitter contains information as to whether to sound a stimulation tone.

15. The system of claim 1, wherein the remote correction signal includes a carrier signal and a plurality of substantially identical stimulation signal bytes that are modulated by the carrier signal.

16. The system of claim 15, wherein the frequency of the carrier signal is approximately 303 MHz.

17. The system of claim 15, wherein a plurality of remote receivers are each fitted to one of the different animals and are tuned to receive the remote correction signal from the remote transmitter; a plurality of stimulators are each fitted to one of the different animals and are each capable of administering a plurality of levels of stimulation; a plurality of processors are each fitted to one of the different animals, each being associated with the stimulator and remote receiver on that animal, and each having a different identification number; and further wherein three bits of each stimulation signal byte contain information as to the identification of the processor, three bits of each remote correction signal contain information as to the level of stimulation to be administered to the animal, and one bit of each stimulation signal byte contains information as to whether to sound a stimulation tone.

18. A combined animal confinement and remote training system, comprising:

means for transmitting a confinement signal to define a containment boundary;

means for receiving the confinement signal;

remote means for transmitting a correction signal;

means for receiving the correction signal from the remote means; and means associated with the confinement signal receiving means and the remote signal receiving means for decoding one of the confinement signal and the correction signal and administering a stimulus to an animal.

19. The system of claim 18, wherein the decoding and administering means is configured so that the correction signal overrides the confinement signal.

20. The system of claim 18, further comprising means associated with the decoding and administering means for configuring the decoding and administering means to one of a remote only mode where the stimulus is administered to the animal only in response to the correction signal, a confinement only mode where the stimulus is administered to the animal only in response to the confinement signal, and a remote and confinement mode where the stimulus is administered to the animal in response to one of the correction signal and the confinement signal.

21. The system of claim 20, wherein the configuring means includes a magnetic switch associated with the decoding and administering means such that one of the modes is selected by actuating the switch.

22. The system of claim 20, wherein the decoding and administering means includes a processor associated with the confinement signal receiving means and correction signal receiving means and a stimulator associated with the processor, the processor decoding the confinement signal in the confinement only mode, the correction signal in the remote only mode, and one of the confinement signal and correction signal in the remote and confinement mode, and further wherein the processor activates the stimulator to administer the stimulus to the animal.

23. The system of claim 18, wherein the means for transmitting a confinement signal includes a confinement wire around at least a portion of an area to define the containment boundary and a confinement transmitter electrically associated with the confinement wire that transmits an electromagnetic signal of a predetermined frequency that is received by the confinement signal receiving means when the animal is within a predefined distance from the confinement wire.

24. A combined animal confinement and remote training system, comprising:
   a confinement transmitter that transmits an electromagnetic confinement signal of a predetermined frequency to define a containment boundary;
   a containment receiver tuned to receive the confinement signal;
   a remote transmitter for transmitting a correction signal of a predetermined frequency;
   a remote receiver tuned to receive the correction signal;
   a decoder associated with the containment receiver and remote receiver that decodes one of the confinement signal and the correction signal; and
   a stimulator associated with the decoder that administers a stimulus to an animal in response to one of a decoded confinement signal and a decoded correction signal.

25. The system of claim 24, wherein the confinement transmitter includes a confinement wire oriented to define a boundary and a transmitter associated with the confinement wire.

26. The system of claim 24, wherein the decoder includes a processor.

27. The system of claim 24, wherein the decoder is configured so that the correction signal overrides the confinement signal.

28. The system of claim 24, wherein the decoder is selectively configurable to one of a plurality of modes, including a remote only mode in which the decoder decodes only the correction signal, a confinement only mode in which the decoder decodes only the confinement signal, and a remote and confinement mode in which the decoder decodes one of the correction signal and the confinement signal.

29. A method of operating a processor of an animal confinement and remote training system, the method comprising the steps of:
   decoding a correction signal from a remote transmitter of the system, the remote transmitter transmitting a correction signal of a predetermined frequency, when both the signal from the remote transmitter and a confinement signal from a confinement transmitter of the system are present, the confinement transmitter transmitting a confinement signal of a predetermined frequency to define a containment boundary;
   decoding one of the correction signal from the remote transmitter and the confinement signal when only one of these signals is present; and
   enabling a stimulator of the system to administer a corrective stimulus to the animal based upon either a decoded correction signal or a decoded confinement signal.

30. The method of claim 29, wherein the remote transmitter transmits first and second correction signals, and further comprising the step of programming the processor to enable the stimulator to administer a first corrective stimulus to the animal based upon a decoded first correction signal and a second corrective stimulus to the animal, that is different than the first corrective stimulus, based upon a decoded second correction signal.

31. The method of claim 29, further comprising the step of selectively configuring the processor to one of a plurality of modes, including a remote only mode in which the processor decodes only the correction signal from the remote transmitter, a confinement only mode in which the processor decodes only the confinement signal, and a remote and confinement mode in which the processor decodes one of the correction signal from the remote transmitter and the confinement signal.

* * * * *